United States Patent [19]

Werfelman

[11] 4,260,426

[45] Apr. 7, 1981

[54] ENVIRONMENTAL FILTERS

[75] Inventor: Daniel H. Werfelman, Mokena, Ill.

[73] Assignee: CPC International Inc., Englewood Cliffs, N.J.

[21] Appl. No.: 93,419

[22] Filed: Nov. 13, 1979

[51] Int. Cl.³ .............................................. B01D 33/30
[52] U.S. Cl. ...................................... 134/29; 134/30; 210/794; 210/283; 210/293
[58] Field of Search ...................................... 210/80–82, 210/266, 274, 275, 283, 284, 293; 134/26, 29, 37, 30

[56] References Cited
U.S. PATENT DOCUMENTS

| | | | |
|---|---|---|---|
| 3,436,260 | 4/1969 | Duff | 210/80 |
| 3,554,377 | 1/1971 | Miller | 210/283 |
| 3,803,031 | 4/1974 | Keller | 210/80 |

Primary Examiner—Ivars C. Cintins

[57] ABSTRACT

A filter apparatus having multiple filter medias for use in environmental control, food processing and other industrial applications, is provided with movable filter media separators that maintain media separation while permitting bed expansion during a backwash cleaning operation. The filter bed can comprise, for example, a lower sand layer and an upper anthracite layer, as well as a free board zone above the anthracite layer. Said layers are separated by a movable filter media separator. A screen is provided at the filter inlet to prevent loss of filter media during the backwash cleaning operation.

4 Claims, 2 Drawing Figures

ENVIRONMENTAL FILTERS

BACKGROUND OF THE INVENTION

1. Field of the Invention

The present invention relates to filter apparatus, and more particularly to a filter having a bed comprised of multiple separated filter medias that is permitted to expand during a backwash cleaning operation.

2. The Prior Art

Filters provided with multiple loose particulate medias such as sand, crushed stone, anthracite, carbon, diatomaceous earth and other suitable materials known in the art, have been utilized in industry for decades. Problems commonly associated with filters of this type are cleaning of the filter bed and separation of the filter medias. Various solutions to these problems have been described in the prior art as discussed below.

In U.S. Pat. No. 356,819, granular filter material is packed in a diaphragm having wire cloth on both sides. The diaphragm is then cemented to the inside walls of the filter to prevent it from moving in response to the current passing through the filter. This diaphragm arrangement prevents loss of the filter media. The diaphragms are individually cleaned when necessary.

U.S. Pat. No. 651,948 describes a water filter containing asbestos, charcoal and sand with partitions therebetween. A water tight seal is provided between the partitions and the filter wall. The invention provides for physically removing the partition and medias for cleaning purposes.

An anthracite and sand filter is described in U.S. Pat. No. 3,436,260. This filter is utilized in cane sugar refining. It is cleaned by backwashing with water and "scouring gas." The filter is not provided with a separator between the anthracite and sand.

British Pat. Nos. 3390 and 2557 also describe filters having sand and carbn media. In the 3390 patent, filtering plates are provided which can be removed for replacement or cleaning. The sand or charcoal is packed in an envelope that forms a part of the plate. The 2557 patent describes a filter having a perforated false bottom and a movable hinged top which can be opened for cleaning purposes.

The present invention is an improvement in filter apparatus which provides for separation of multiple filter medias and allows expansion of the filter bed during a backwash cleaning operation.

SUMMARY OF THE INVENTION

The present invention is directed to apparatus for filtering liquid materials, particularly discharge effluent streams and food processing liquids. It is generally useful in industrial applications wherein continuous filtering of process and effluent streams is required.

In accordance with the invention, the filter apparatus is provided with media separators which separate multiple filter medias. Said media separators are mounted in sliding relation to the inner walls of a filter casing to permit expansion of the filter medias during backwash cleaning operations. Several separators can be provided to permit separation of multiple filter medias or to provide for alternation of filtering zones. For example, a filter having two anthracite layers and an intermediate layer of sand.

A free board zone is provided at the top of the filter to allow for expansion of the bed during the backwash cleaning operation. The filter is also provided with a screen at the inlet to prevent loss of filter media during said backwash cleaning operation.

One embodiment of the present invention is described in detail below with reference to the drawings.

DESCRIPTION OF THE DRAWINGS

Referring now to FIG. 1, there is shown in detail a cross-sectional view of a filter apparatus of this invention. The apparatus includes a vertical housing designated as 10 which is provided at the top with inlet 11. Screen 12 is provided below the inlet to prevent loss of the anthracite 14 during the backwash cleaning operation. A free board zone 13 is provided in the upper portion of the housing 10 to permit expansion of the filter bed during backwash cleaning. Media separator 15 is mounted in sliding relation to housing 10 and is provided between the anthracite 14 and sand 16 filter medias. In the lower portion of the housing 10, a porous false bottom 17 is provided. Filtered material leaves through outlet 18. The same outlet 18 is used as the inlet for backwash cleaning of the filter apparatus.

Figure 1:
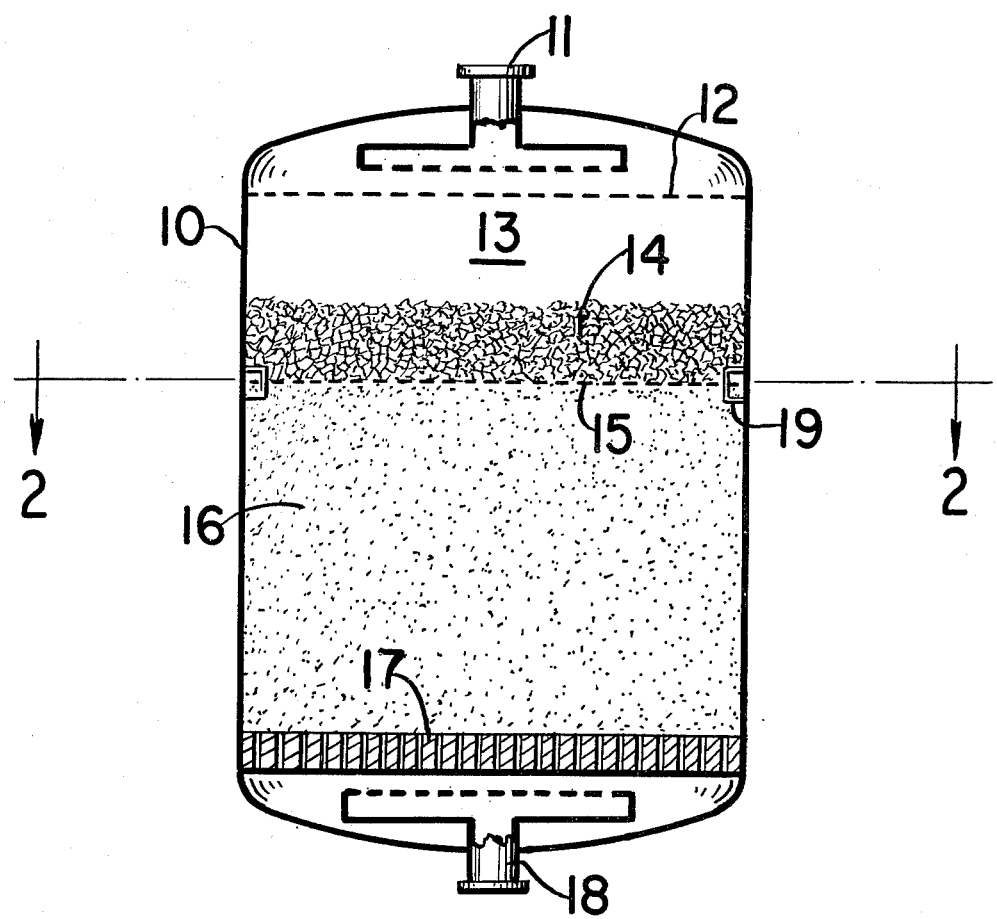
FIG. 1 is a sectional view of a sand and anthracite filter according to the present invention.

A plurality of media separator mountings 19 are provided around the inside of housing 10. The media separator 15 rests on or near the lower portion of mountings 19 during the filtering operation. During backwash cleaning, media separator 15 is allowed to slide along the vertical portion of mountings 19 to permit expansion of the sand 16. A guide 20 is provided in media separator 15 to facilitate sliding of said separator along the vertical portion of mountings 19. Edge 21 of the media separator 15 is maintained in close tolerance to the inside wall of housing 10.

Other mechanical means which facilitate sliding of the media separator 15 in relation to housing 10, such as pin-groove designs, etc., are contemplated by the present invention and can be easily fabricated by those skilled in the art.

Figure 2:
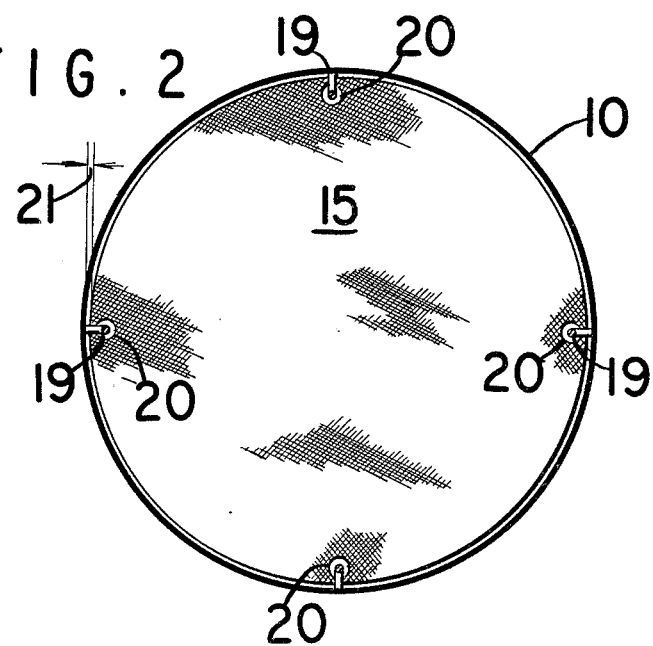
FIG. 2 is a sectional view along the line 2—2 in FIG. 1.

FIG. 2 is provided to further illustrate the relationship of media separator 15 to mountings 19 and the inside of housing 10.

The following examples are given to illustrate further the present invention.

EXAMPLE I

A filter apparatus according to the present invention was fabricated in a filter tank having an inside diameter of eight feet and a height of eight feet. The tank was provided with a false bottom comprised of a screen (#8×0.032 inch). Sand (#50) was then added to the tank to a depth of four feet from the bottom of the tank. A media separator comprised of a 304 stainless steel screen (#8×0.32 inch×8 feet diameter) was then mounted in sliding relation to the tank. Anthracite (#2) was then added to a depth of two feet. The remaining two feet was left as free board. A screen (#8×0.32 inch) was also provided over the inlet of the filter tank.

EXAMPLE II

The filter apparatus of Example I was connected in the composite water effluent stream from a food processing plant. Effluent flow was maintained at 300 gallons per minute for a period of 7 hours. Filter supply pressure on the sand varied between 10 and 20 pounds per square inch over the 7 hour run. An effluent pH below 3 was maintained throughout the run. This was necessary to prevent solubilization of the fats, oils and grease. When the pH is allowed to go over 3, solubilization causes the fats, oils and grease to pass through the filter without effective filtration.

When a steady state condition was achieved, samples were taken from the inlet and outlet streams. The results are summarized in Table I.

TABLE I

| Parameter | Inlet | Outlet |
|---|---|---|
| pH | 2.3 | 2.3 |
| Biological Demand | — | 1000 |
| Total Suspended Solids | 218 | 63 |
| Volatile Suspended Solids | 218 | 63 |
| Fats, Oils, Grease | 558 | 61 |

Outlet effluent was clear in contrast to the cloudy inlet effluent. As can be seen from Table I, nearly 90% of the fats, oils and grease and about 70% of suspended solids were removed from the composite water effluent stream.

EXAMPLE III

The filter apparatus of Example I was regenerated after three hours operation at normal plant conditions. In a first regeneration step, air at 60 pounds pressure was backwashed through the filter for 15 minutes. The filter was then backwashed with caustic at a pH of about 14 for 30 minutes. This was followed by further air backwashing at 60 pounds pressure for 5 minutes. Finally, the filter was backwashed with clean water for 8 minutes.

One skilled in the art can easily determine when it is necessary to regenerate the filter. Based on experience in a food processing plant, it was found that the filter described in Example I required regeneration after three hours operation or when the differential pressure on the sand reached 65 pounds during filtration. Several filters can be piped for automatic operation whereby individual filters go offstream when necessary for regeneration and standby while others simultaneously go onstream for filtration.

Having set forth the general nature and some specific examples of the present invention, the scope of the invention is now particularly set forth in the appended claims.

What is claimed is:

1. Apparatus for filtering liquids comprising a vertical housing provided with upper inlet and lower outlet means, a bed provided within said housing having multiple filter medias separated by horizontal media separators, said separators being provided with multiple spaced guide means disposed in close proximity to the outer periphery of said separators and multiple cooperating guide means spaced around the inner wall of said housing whereby said separators are positioned in guided, vertical sliding relation to said housing, a free board zone in the upper interior portion of said housing and a screening means provided across said upper inlet means.

2. The apparatus of claim 1 further comprising a porous false bottom in the lower portion of said housing in supporting relationship to said bed.

3. The apparatus of claims 1 or 2 wherein said filter medias are comprised of an upper layer of anthracite and a lower layer of sand.

4. A method of regenerating the apparatus of claim 1 comprising the sequential steps of:
 (a) backwashing with air;
 (b) backwashing with caustic at a pH of about 14;
 (c) backwashing with air; and
 (d) backwashing with water.

* * * * *